United States Patent
Nakazawa et al.

(10) Patent No.: US 11,492,115 B2
(45) Date of Patent: Nov. 8, 2022

(54) UNMANNED AERIAL VEHICLE DISPLAY CONTROL SYSTEM, DISPLAY CONTROL DEVICE AND DISPLAY CONTROL METHOD

(71) Applicant: RAKUTEN GROUP, INC., Tokyo (JP)

(72) Inventors: Mitsuru Nakazawa, Tokyo (JP); Hiroaki Iwase, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 42 days.

(21) Appl. No.: 17/043,658

(22) PCT Filed: Nov. 30, 2018

(86) PCT No.: PCT/JP2018/044182
§ 371 (c)(1),
(2) Date: Sep. 30, 2020

(87) PCT Pub. No.: WO2020/110293
PCT Pub. Date: Jun. 4, 2020

(65) Prior Publication Data
US 2021/0031916 A1 Feb. 4, 2021

(51) Int. Cl.
*G02B 27/01* (2006.01)
*B64C 39/02* (2006.01)

(52) U.S. Cl.
CPC ........ *B64C 39/024* (2013.01); *G02B 27/0172* (2013.01); *G02B 27/0179* (2013.01);
(Continued)

(58) Field of Classification Search
CPC ........ B64C 2201/127; B64C 2201/146; B64C 39/024; G02B 2027/0138;
(Continued)

(56) References Cited

U.S. PATENT DOCUMENTS 8,521,339 B2 * 8/2013 Gariepy ............... G05D 1/0044
701/2
9,459,620 B1 * 10/2016 Schaffalitzky ........... B64D 1/12
(Continued)

FOREIGN PATENT DOCUMENTS

JP 2003267295 A 9/2003
JP 2017119501 A 7/2017
(Continued)

OTHER PUBLICATIONS

International Search Report for PCT/JP2018/044182 with English translation.

*Primary Examiner* — Ram A Mistry
(74) *Attorney, Agent, or Firm* — HEA Law PLLC

(57) ABSTRACT

Provided are a display control system, a display control device, and a display control method, which are capable of appropriately controlling a display state of an image photographed by a camera included in an unmanned aerial vehicle. A sensing data acquisition module acquires an aerial vehicle photographing image photographed by the camera included in the unmanned aerial vehicle in flight. A determiner determines whether an operator of the unmanned aerial vehicle is viewing the unmanned aerial vehicle with his or her eyes based on sensing data on at least one of the unmanned aerial vehicle or the operator. A display controller controls a display state of the aerial vehicle photographing image on a display depending on whether determination that the operator is not viewing the unmanned aerial vehicle with his or her eyes is continued.

15 Claims, 6 Drawing Sheets

(52) U.S. Cl.
CPC .. *B64C 2201/127* (2013.01); *B64C 2201/146* (2013.01); *G02B 2027/0138* (2013.01); *G02B 2027/0178* (2013.01); *G02B 2027/0187* (2013.01)

(58) Field of Classification Search
CPC .... G02B 2027/0178; G02B 2027/0187; G02B 27/0093; G02B 27/0172; G02B 27/0179; G05D 1/00
See application file for complete search history.

(56) References Cited

U.S. PATENT DOCUMENTS

| | | | |
|---|---|---|---|
| 2014/0208145 A1* | 7/2014 | Piccolotto | G06F 1/3231 713/324 |
| 2018/0107213 A1 | 4/2018 | Kuhara | |
| 2018/0173220 A1* | 6/2018 | Wang | B64C 27/006 |
| 2018/0217590 A1* | 8/2018 | Kobayashi | G05D 1/0038 |
| 2019/0049949 A1* | 2/2019 | Moeller | G05D 1/0038 |

FOREIGN PATENT DOCUMENTS

| | | |
|---|---|---|
| JP | 2018121267 A | 8/2018 |
| JP | 2018165066 A | 10/2018 |

* cited by examiner

UNMANNED AERIAL VEHICLE DISPLAY CONTROL SYSTEM, DISPLAY CONTROL DEVICE AND DISPLAY CONTROL METHOD

CROSS REFERENCE TO RELATED APPLICATIONS

This application is a National Stage of International Application No. PCT/JP2018/044182 filed on Nov. 30, 2018. The contents of the above document is incorporated herein by reference in its entirety.

TECHNICAL FIELD

The present invention relates to a display control system, a display control device, and a display control method.

BACKGROUND ART

When an unmanned aerial vehicle is controlled to fly, in principle, an operator of the unmanned aerial vehicle is required to view the unmanned aerial vehicle with his or her eyes in order to secure safety of the unmanned aerial vehicle and its surroundings. Then, under a situation in which the operator of the unmanned aerial vehicle cannot visually recognize the unmanned aerial vehicle, the operator of the unmanned aerial vehicle is required to grasp the situation of the surroundings of the unmanned aerial vehicle by, for example, an image (hereinafter referred to as "aerial vehicle photographing image") obtained by photographing an image of the surroundings by a camera included in the unmanned aerial vehicle.

As an example of a technology of presenting an aerial vehicle photographing image to the operator of the unmanned aerial vehicle, in Patent Literature 1, there is described a remote operation system configured to present to an operator an image to be used for operation, which is created based on an omnidirectional image photographed by an omnidirectional camera mounted to an unmanned helicopter.

Further, in Patent Literature 2, it is described that a video captured by a camera of an unmanned flying object is displayed on a head-mounted display worn on a head of an operator.

CITATION LIST

Patent Literature

[PTL 1] JP 2003-267295 A
[PTL 2] JP 2017-119501 A

SUMMARY OF INVENTION

Technical Problem

Under a situation in which an operator of an unmanned aerial vehicle is viewing the unmanned aerial vehicle with his or her eyes, it is desired that presentation of an aerial vehicle photographing image to the operator be suppressed in order not to block his or her eyesight as much as possible. Meanwhile, when the operator of the unmanned aerial vehicle is not viewing the unmanned aerial vehicle with his or her eyes, it is desired to present the aerial vehicle photographing image to the operator, to thereby notify the operator of a surrounding situation of the unmanned aerial vehicle.

However, the operator may feel uncomfortable when whether to present the aerial vehicle photographing image is switched frequently in such a manner that the operator is presented with the aerial vehicle photographing image immediately after simply taking his or her eyes off the unmanned aerial vehicle in a short period of time.

In the technology described in Patent Literature 1, the above-mentioned image to be used for operation is always presented to the operator. Further, also in the technology described in Patent Literature 2, the video captured by the camera of the unmanned flying object remains to be displayed on the head-mounted display.

One or more embodiments of the present invention have been made in view of the above-mentioned issue, and are directed to provide a display control system, a display control device, and a display control method, which are capable of appropriately controlling a display state of an image photographed by a camera included in an unmanned aerial vehicle.

Solution to Problem

In order to solve the above-mentioned issue, according to one embodiment of the present invention, there is provided a display control system including: image acquisition means for acquiring an aerial vehicle photographing image photographed by a camera included in an unmanned aerial vehicle in flight; determination means for determining whether an operator of the unmanned aerial vehicle is viewing the unmanned aerial vehicle with his or her eyes based on sensing data on at least one of the unmanned aerial vehicle or the operator; and display control means for controlling a display state of the aerial vehicle photographing image on a display depending on whether determination that the operator is not viewing the unmanned aerial vehicle with his or her eyes is continued.

In one aspect of the present invention, the determination means is further configured to determine whether the determination that the operator is not viewing the unmanned aerial vehicle with his or her eyes is continued depending on whether the determination that the operator is not viewing the unmanned aerial vehicle with his or her eyes is made continuously for a predetermined number of times, and the display control means is configured to control the display state of the aerial vehicle photographing image on the display depending on a result of determining whether the determination that the operator is not viewing the unmanned aerial vehicle with his or her eyes is made continuously for the predetermined number of times.

Alternatively, the determination means is further configured to determine whether the determination that the operator is not viewing the unmanned aerial vehicle with his or her eyes is continued depending on whether the determination that the operator is not viewing the unmanned aerial vehicle with his or her eyes is continued over a predetermined period of time, and the display control means is configured to control the display state of the aerial vehicle photographing image on the display depending on a result of determining whether the determination that the operator is not viewing the unmanned aerial vehicle with his or her eyes is continued over the predetermined period of time.

Further, in one aspect of the present invention, the display control means is configured to control whether to display the aerial vehicle photographing image on the display depending on whether the determination that the operator is not viewing the unmanned aerial vehicle with his or her eyes is continued.

Alternatively, the display control means is configured to control a size of the aerial vehicle photographing image displayed on the display depending on whether the determination that the operator is not viewing the unmanned aerial vehicle with his or her eyes is continued.

Further, in one aspect of the present invention, the determination means is configured to determine whether the operator is viewing the unmanned aerial vehicle with his or her eyes based on a distance between the unmanned aerial vehicle and the operator.

Further, in one aspect of the present invention, the determination means is configured to determine whether the operator is viewing the unmanned aerial vehicle with his or her eyes based on a range of a field of view of the operator and on a position of the unmanned aerial vehicle.

Further, in one aspect of the present invention, the determination means is configured to determine whether the operator is viewing the unmanned aerial vehicle with his or her eyes based on an operator photographing image photographed by a camera arranged at a head of the operator.

Further, in one aspect of the present invention, the display control means is configured to control the display state of the aerial vehicle photographing image on the display included in a head-mounted display worn by the operator, depending on whether the determination that the operator is not viewing the unmanned aerial vehicle with his or her eyes is continued.

Further, in one aspect of the present invention, the determination means is configured to determine whether the operator is viewing the unmanned aerial vehicle with his or her eyes based on an operator photographing image photographed by a camera included in a head-mounted display worn by the operator, and the display control means is configured to control the display state of the aerial vehicle photographing image on the display included in the head-mounted display, depending on whether the determination that the operator is not viewing the unmanned aerial vehicle with his or her eyes is continued.

Further, in one aspect of the present invention, the display control system further includes guide means for providing the operator with guide information for guiding the operator so as to enable the operator to view the unmanned aerial vehicle with his or her eyes when the operator is not viewing the unmanned aerial vehicle with his or her eyes.

Further, according to one embodiment of the present invention, there is provided a display control device including: image acquisition means for acquiring an aerial vehicle photographing image photographed by a camera included in an unmanned aerial vehicle in flight; determination means for determining whether an operator of the unmanned aerial vehicle is viewing the unmanned aerial vehicle with his or her eyes based on sensing data on at least one of the unmanned aerial vehicle or the operator; and display control means for controlling a display state of the aerial vehicle photographing image on a display depending on whether determination that the operator is not viewing the unmanned aerial vehicle with his or her eyes is continued.

Further, according to one embodiment of the present invention, there is provided a display control method including the steps of: acquiring an aerial vehicle photographing image photographed by a camera included in an unmanned aerial vehicle in flight; determining whether an operator of the unmanned aerial vehicle is viewing the unmanned aerial vehicle with his or her eyes based on sensing data on at least one of the unmanned aerial vehicle or the operator; and controlling a display state of the aerial vehicle photographing image on a display depending on whether determination that the operator is not viewing the unmanned aerial vehicle with his or her eyes is continued.

DESCRIPTION OF EMBODIMENTS

Now, one embodiment of the present invention is described with reference to the drawings.

Figure 1:
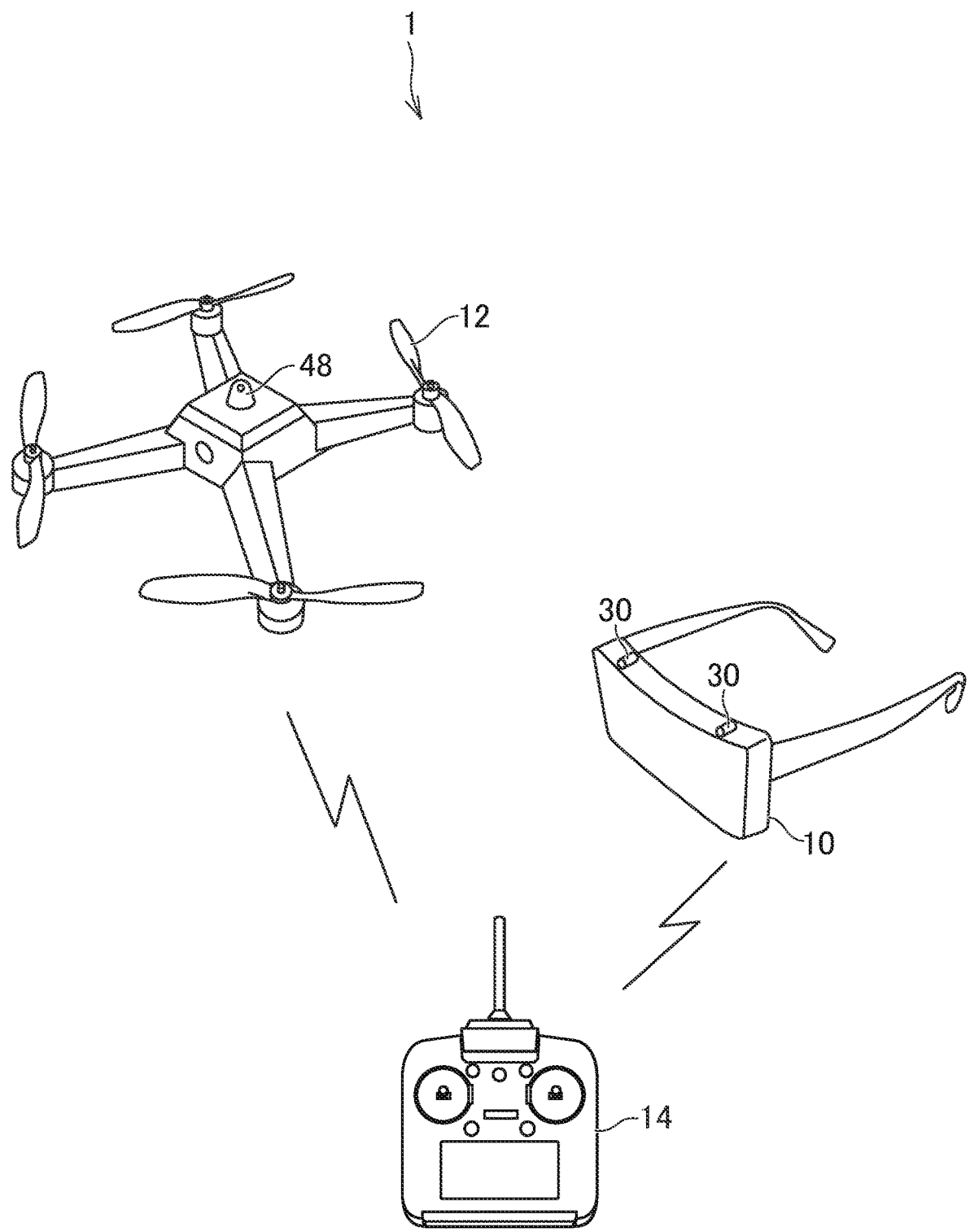
FIG. 1 is a diagram for illustrating an example of an overall configuration of a display control system according to one embodiment of the present invention.

FIG. 1 is a diagram for illustrating an example of an overall configuration of a display control system 1 according to one embodiment of the present invention. As illustrated in FIG. 1, the display control system 1 according to this embodiment includes a head-mounted display (HMD) 10, an unmanned aerial vehicle 12, and an operation terminal 14.

As illustrated in FIG. 1, the operation terminal 14 and the unmanned aerial vehicle 12 can communicate to/from each other. Further, the HMD 10 and the operation terminal 14 can communicate to/from each other. The HMD 10 and the unmanned aerial vehicle 12 may be able to directly communicate to/from each other without intervention of the operation terminal 14.

The HMD 10 is a display device that can be worn on the head of an operator of the unmanned aerial vehicle 12. In the following description, it is assumed that the HMD 10 in this embodiment is a video see-through HMD. Thus, the operator of the unmanned aerial vehicle 12 wearing the HMD 10 can visually recognize a situation of the real space via an image photographed by a camera device 30 described later (hereinafter referred to as "operator photographing image").

Figure 2A:
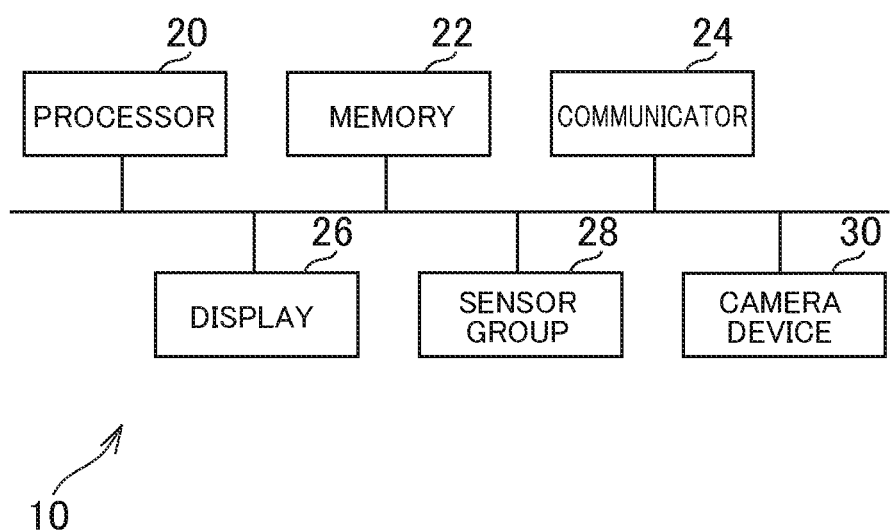
FIG. 2A is a diagram for illustrating an example of a configuration of a head-mounted display in one embodiment of the present invention.

As illustrated in FIG. 2A, for example, the HMD 10 in this embodiment includes a processor 20, a memory 22, a communicator 24, a display 26, a sensor group 28, and a camera device 30. The HMD 10 may include a sound output device, for example, a speaker.

The processor 20 is a program control device, for example, a microprocessor, which is configured to operate in accordance with a program installed in the HMD 10, for example.

The memory 22 is a memory element such as a ROM, a RAM, or a flash memory. The memory 22 stores, for example, a program to be executed by the processor 20.

The communicator 24 is a communication interface such as a wireless LAN module or a Bluetooth (trademark) module.

The display 26 is a display such as a liquid crystal display or an organic EL display, which is arranged in front of the HMD 10. The display 26 in this embodiment is configured to be able to display a three-dimensional image by displaying an image for a left eye and an image for a right eye, for example. The display 26 may be a display that cannot display a three-dimensional image, but can display only a two-dimensional image.

The sensor group 28 is a device including a global navigation satellite system (GNSS) receiver, for example, a global positioning system (GPS) receiver, an inertial sensor such as an acceleration sensor or a gyro sensor, and a geomagnetic sensor. The sensor group 28 can measure the position or posture of the HMD 10. The sensor group 28 may output measurement results, such as the position or posture of the HMD 10, to the processor 20 at a predetermined sampling rate.

The camera device 30 is a device including one or a plurality of cameras configured to photograph the operator photographing image being an image of a range of a field of view of a wearer of the HMD 10. The camera device 30 may photograph the operator photographing image at the predetermined sampling rate.

The unmanned aerial vehicle 12 is an aerial vehicle that does not accommodate a person, and is, for example, an unmanned aerial vehicle configured to be driven by a battery or an engine (so-called drone). The unmanned aerial vehicle 12 in this embodiment may have an autonomous flight function.

Figure 2B:
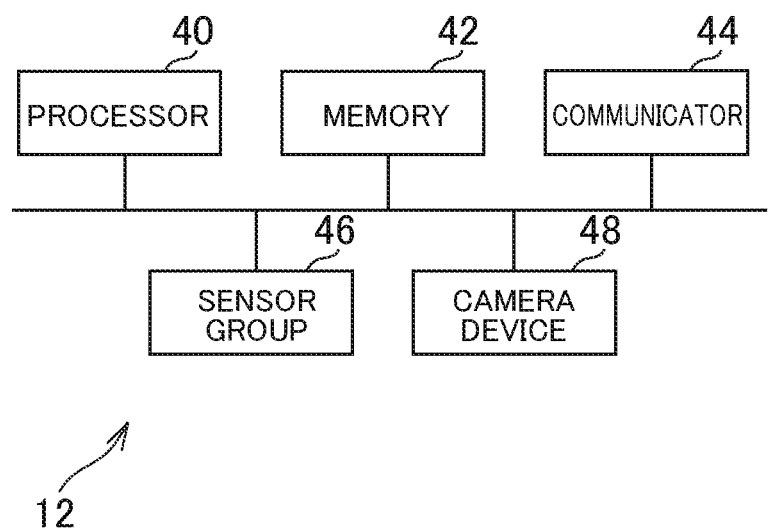
FIG. 2B is a diagram for illustrating an example of a configuration of an unmanned aerial vehicle in one embodiment of the present invention.

For example, as illustrated in FIG. 2B, the unmanned aerial vehicle 12 in this embodiment includes a processor 40, a memory 42, a communicator 44, a sensor group 46, and a camera device 48. The unmanned aerial vehicle 12 includes general hardware components such as a propeller, a motor, and a battery, but a description thereof is omitted here.

The processor 40 is a program control device, for example, a microprocessor, which is configured to operate in accordance with a program installed in the unmanned aerial vehicle 12, for example.

The memory 42 is a memory element such as a ROM, a RAM, or a flash memory. The memory 42 stores, for example, a program to be executed by the processor 40.

The communicator 44 is a communication interface such as a wireless LAN module or a Bluetooth module.

The sensor group 46 is a device including a GNSS receiver, for example, a GPS receiver, an altitude sensor such as an air pressure sensor, a light detection and ranging (LIDAR) sensor or a sound wave sensor, an inertial sensor, and a wind speed sensor. The sensor group 46 can measure the position or posture of the unmanned aerial vehicle 12. The sensor group 46 may output measurement results, such as the position or posture of the unmanned aerial vehicle 12, to the processor 40 at a predetermined sampling rate. Further, the communicator 44 may transmit the measurement results to the HMD 10 at a predetermined sampling rate.

The camera device 48 is a device including one or a plurality of cameras configured to photograph the surroundings of the unmanned aerial vehicle 12, for example. The camera device 48 may include an omnidirectional camera capable of photographing an omnidirectional image of the surroundings of the unmanned aerial vehicle 12, for example. The image photographed by the camera device 48 of the unmanned aerial vehicle 12 is hereinafter referred to as an "aerial vehicle photographing image". The camera device 48 may photograph an aerial vehicle photographing image at a predetermined sampling rate. Further, the communicator 44 may transmit the aerial vehicle photographing image to the HMD 10 at a predetermined sampling rate.

The operation terminal 14 in this embodiment is a device for operating the unmanned aerial vehicle 12, for example.

In this embodiment, for example, it is repeatedly determined whether the operator is viewing the unmanned aerial vehicle 12 with his or her eyes. In this case, for example, it is assumed that the unmanned aerial vehicle 12 exists at a position P1 indicated in FIG. 3, and the operator of the unmanned aerial vehicle 12 exists at a position P0 indicated in FIG. 3. It is assumed that a distance between the position P1 and the position P0 is smaller than a predetermined distance. Further, it is assumed that the camera device 30 is facing in a direction A1 pointing from the position P0 to the position P1. In this case, it is determined that the operator is viewing the unmanned aerial vehicle 12 with his or her eyes.

Figure 3:
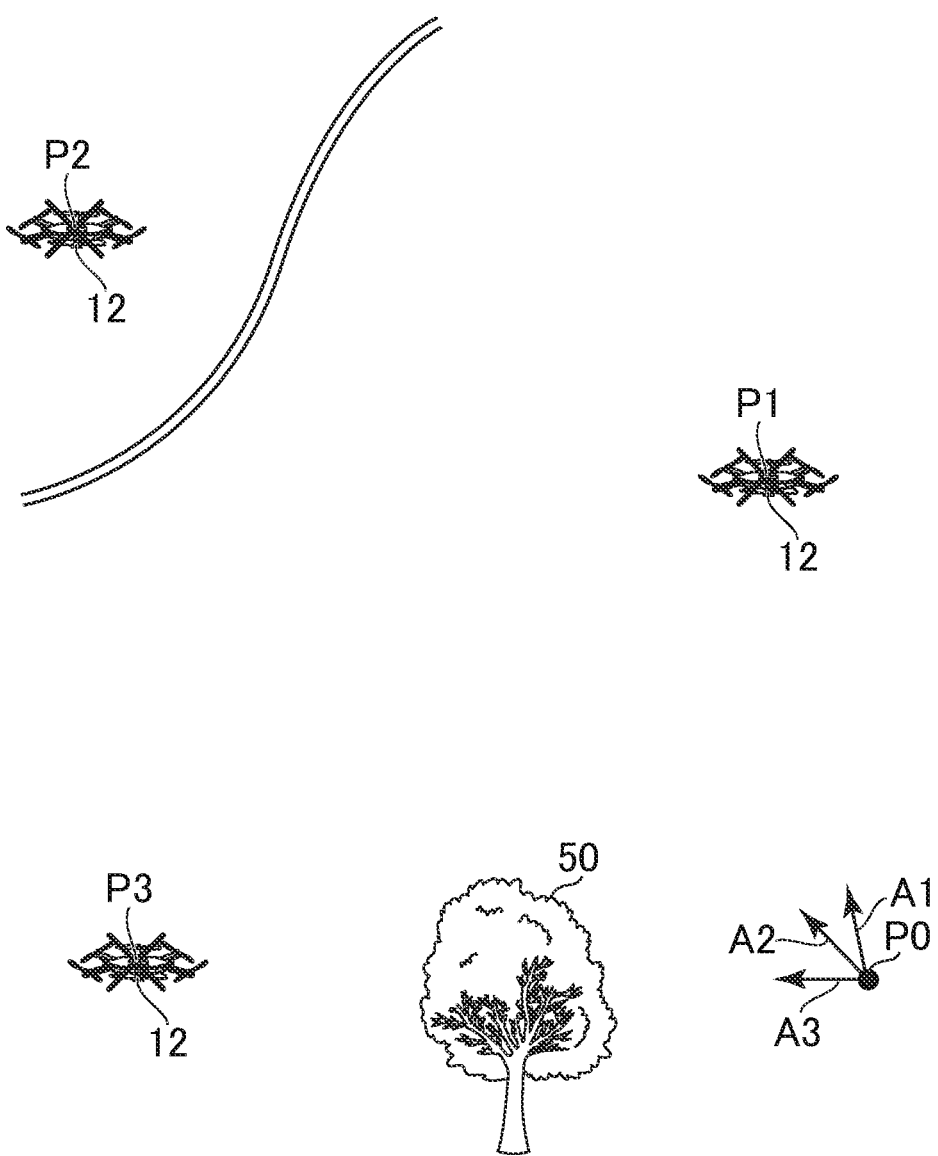
FIG. 3 is a schematic diagram for illustrating an example of a relationship between a position of the unmanned aerial vehicle and a position of an operator.

Meanwhile, it is assumed that another unmanned aerial vehicle 12 exists at a position P2 indicated in FIG. 3, and the operator of the unmanned aerial vehicle 12 exists at the position P0 indicated in FIG. 3. A distance between the position P2 and the position P0 is larger than the predetermined distance, and the operator cannot view the unmanned aerial vehicle 12 with his or her eyes by an operator photographing image even when the camera device 30 is facing in a direction A2 pointing from the position P0 to the position P2. In this case, it is determined that the operator is not viewing the unmanned aerial vehicle 12 with his or her eyes.

Further, it is assumed that another unmanned aerial vehicle 12 exists at a position P3 indicated in FIG. 3, and the operator of the unmanned aerial vehicle 12 exists at the position P0 indicated in FIG. 3. A distance between the position P3 and the position P0 is smaller than the predetermined distance, but the operator cannot view the unmanned aerial vehicle 12 with his or her eyes by an operator photographing image even when the camera device 30 is facing in a direction A3 pointing from the position P0 to the position P3 due to an obstacle, for example, a tree 50 between the position P3 and the position P0. Also in this case, it is determined that the operator is not viewing the unmanned aerial vehicle 12 with his or her eyes.

Further, for example, even in a case where the unmanned aerial vehicle 12 exists at the position P1, and the operator of the unmanned aerial vehicle 12 exists at the position P0, when the camera device 30 is facing in the direction A2 or the direction A3, the unmanned aerial vehicle 12 is not located within a field of view (FOV) of the camera device 30. Thus, the operator cannot view the unmanned aerial vehicle 12 with his or her eyes by an operator photographing image. Also in this case, it is determined that the operator is not viewing the unmanned aerial vehicle 12 with his or her eyes.

Further, in this embodiment, for example, it is determined whether the determination that the operator is not viewing the unmanned aerial vehicle 12 with his or her eyes is continued. In this case, for example, it may be determined whether the determination that the operator is not viewing the unmanned aerial vehicle 12 with his or her eyes is continued depending on whether the determination that the operator is not viewing the unmanned aerial vehicle 12 with his or her eyes is made continuously for a predetermined number of times. Alternatively, it may be determined whether the determination that the operator is not viewing the unmanned aerial vehicle 12 with his or her eyes is continued depending on whether the determination that the operator is not viewing the unmanned aerial vehicle 12 with his or her eyes is continued over a predetermined period of time.

Further, the display state of the aerial vehicle photographing image on the display 26 is controlled depending on the result of determination. For example, when it is determined that the determination that the operator is not viewing the unmanned aerial vehicle 12 with his or her eyes is continued, an aerial vehicle photographing image photographed by the camera device 48 of the unmanned aerial vehicle 12 is displayed on the display 26. In this case, an operator photographing image photographed by the camera device 30 of the HMD 10 is not displayed on the display 26. Otherwise, the operator photographing image photographed by the camera device 30 of the HMD 10 is displayed on the display 26 of the HMD 10. In this case, the aerial vehicle photographing image photographed by the camera device 48 of the unmanned aerial vehicle 12 is not displayed on the display 26.

Both of the operator photographing image and the aerial vehicle photographing image may be displayed on the display 26 of the HMD 10. In this case, for example, when it is determined that the determination that the operator is not viewing the unmanned aerial vehicle 12 with his or her eyes is continued, the aerial vehicle photographing image may be displayed in a larger size than that of the operator photographing image. Otherwise, the operator photographing image may be displayed in a larger size than that of the aerial vehicle photographing image.

Further, for example, when it is determined that the determination that the operator is not viewing the unmanned aerial vehicle 12 with his or her eyes is continued, the aerial vehicle photographing image may be displayed on the entire screen of the display 26, and the operator photographing image may be displayed as a wipe on a part of the display 26. Otherwise, the operator photographing image may be displayed on the entire screen of the display 26, and the aerial vehicle photographing image may be displayed as a wipe on a part of the display 26.

When the unmanned aerial vehicle 12 is controlled to fly, in principle, the operator of the unmanned aerial vehicle 12 is required to view the unmanned aerial vehicle 12 with his or her eyes in order to secure safety of the unmanned aerial vehicle or its surroundings. Then, under a situation in which the operator of the unmanned aerial vehicle 12 cannot visually recognize the unmanned aerial vehicle 12, the operator of the unmanned aerial vehicle 12 is required to grasp the situation of the surroundings of the unmanned aerial vehicle 12 by, for example, an aerial vehicle photographing image. Further, even when the unmanned aerial vehicle 12 can fly autonomously, the operator can secure safety more reliably by visually recognizing the unmanned aerial vehicle 12 and switching from the autonomous flight depending on the situation to operate the unmanned aerial vehicle 12.

Under a situation in which the operator of the unmanned aerial vehicle 12 is viewing the unmanned aerial vehicle 12 with his or her eyes, it is desired that presentation of the aerial vehicle photographing image to the operator be suppressed in order not to block his or her eyesight as much as possible. Meanwhile, when the operator of the unmanned aerial vehicle 12 is not viewing the unmanned aerial vehicle 12 with his or her eyes, it is desired to present the aerial vehicle photographing image to the operator, to thereby notify the operator of the surrounding situation of the unmanned aerial vehicle.

However, the operator may feel uncomfortable when whether to present the aerial vehicle photographing image is switched frequently in such a manner that the operator is presented with the aerial vehicle photographing image immediately after simply taking his or her eyes off the unmanned aerial vehicle 12 in a short period of time.

In this embodiment, whether the operator of the unmanned aerial vehicle 12 is viewing the unmanned aerial vehicle 12 with his or her eyes is repeatedly determined, and whether the determination that the operator is not viewing the unmanned aerial vehicle 12 with his or her eyes is continued is determined. Then, the display state of the aerial vehicle photographing image on the display 26 is controlled depending on the result of determining whether the determination that the operator is not viewing the unmanned aerial vehicle 12 with his or her eyes is continued. In this manner, according to this embodiment, it is possible to appropriately control the display state of the aerial vehicle photographing image.

It is conceivable to adopt such an operation that while the operator can view the unmanned aerial vehicle 12 with his or her eyes, the operator operates the unmanned aerial vehicle 12 while viewing the unmanned aerial vehicle 12 with his or her eyes, whereas when the operator can no longer view the unmanned aerial vehicle 12 with his or her eyes, the operator puts on the HMD 10 to operate the unmanned aerial vehicle 12 while seeing the aerial vehicle photographing image. However, in this case, the operator is required to perform additional work of putting on or removing the HMD 10, which leads to occurrence of a period in which the operator cannot operate the unmanned aerial vehicle 12. According to this embodiment, such an operation is not required to be performed.

Now, a description is further given of the function of the HMD 10 in this embodiment and processing to be executed by the HMD 10 in this embodiment.

Figure 4:
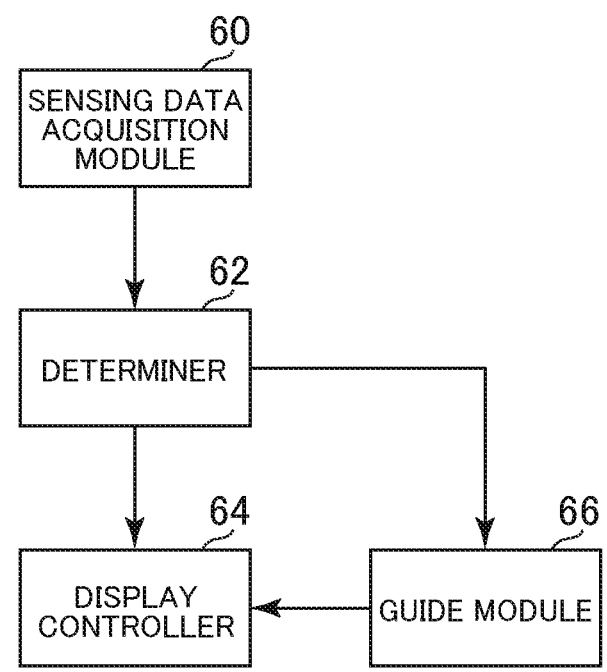
FIG. 4 is a functional block diagram for illustrating an example of functions to be implemented by the head-mounted display in one embodiment of the present invention.

FIG. 4 is a functional block diagram for illustrating an example of functions to be implemented by the HMD 10 in this embodiment. All the functions illustrated in FIG. 4 are not required to be implemented in the HMD 10 in this embodiment, and functions other than the functions illustrated in FIG. 4 may be implemented.

As illustrated in FIG. 4, the HMD 10 in this embodiment includes, for example, a sensing data acquisition module 60, a determiner 62, a display controller 64, and a guide module 66 in terms of its functions. The sensing data acquisition module 60 is mainly implemented by the processor 20, the communicator 24, the sensor group 28, and the camera device 30. The determiner 62 is mainly implemented by the processor 20. The display controller 64 and the guide module 66 are mainly implemented by the processor 20 and the display 26.

The above-mentioned functions may be implemented by the processor 20 executing programs including commands corresponding to the above-mentioned functions, which are installed on the HMD 10 being a computer. Further, the programs may be supplied to the HMD 10 via the Internet or via a computer-readable information storage medium such as an optical disc, a magnetic disk, a magnetic tape, or a magneto-optical disk.

In this embodiment, for example, the sensing data acquisition module 60 acquires sensing data on at least one of the unmanned aerial vehicle 12 or the operator of the unmanned aerial vehicle 12. The sensing data acquisition module 60 may acquire sensing data indicating the results of measurement by the sensor group 28 of the HMD 10 or the sensor group 46 of the unmanned aerial vehicle 12, for example. Further, the sensing data acquired by the sensing data acquisition module 60 may include an aerial vehicle photographing image photographed by the camera device 48 included in the unmanned aerial vehicle 12 in flight. Further, the sensing data acquired by the sensing data acquisition module 60 may include an operator photographing image photographed by the camera device 30 arranged at the head of the operator of the unmanned aerial vehicle 12.

Further, the sensing data acquisition module 60 may acquire, at a predetermined sampling rate, sensing data including an aerial vehicle photographing image and an operator photographing image generated at a predetermined sampling rate.

In this embodiment, for example, the determiner 62 determines whether the operator of the unmanned aerial vehicle 12 is viewing the unmanned aerial vehicle 12 with his or her eyes based on the sensing data on at least one of the unmanned aerial vehicle 12 or the operator. In this case, for example, it is determined whether the operator is viewing the unmanned aerial vehicle 12 with his or her eyes based on the sensing data acquired by the sensing data acquisition module 60.

Further, in this embodiment, the determiner 62 may determine whether the operator is viewing the unmanned aerial vehicle 12 with his or her eyes based on the distance between the unmanned aerial vehicle 12 and the operator. In this case, the position of the HMD 10 may be regarded as the position of the operator. Then, the determiner 62 may determine whether the operator is viewing the unmanned aerial vehicle 12 with his or her eyes based on the distance between the position of the unmanned aerial vehicle 12 and the position of the HMD 10.

Further, the determiner 62 may determine whether the operator is viewing the unmanned aerial vehicle 12 with his or her eyes based on the operator photographing image photographed by a camera arranged at the head of the operator. In this case, for example, it may be determined whether the operator is viewing the unmanned aerial vehicle 12 with his or her eyes based on the operator photographing image photographed by the camera device 30 included in the HMD 10, which is acquired by the sensing data acquisition module 60. Further, for example, it may be determined whether the operator is viewing the unmanned aerial vehicle 12 with his or her eyes based on whether an image of the unmanned aerial vehicle 12 is detected in the operator photographing image.

Further, the determiner 62 may determine whether the operator is viewing the unmanned aerial vehicle 12 with his or her eyes based on the aerial vehicle photographing image. For example, it may be determined whether the operator is viewing the unmanned aerial vehicle 12 with his or her eyes based on the direction of the HMD 10 shown in the aerial vehicle photographing image, for example.

Further, the determiner 62 may determine whether the operator is viewing the unmanned aerial vehicle 12 with his or her eyes based on the range of the field of view of the camera device 30.

Then, in this embodiment, for example, the determiner 62 determines whether the determination that the operator is not viewing the unmanned aerial vehicle 12 with his or her eyes is continued.

In this embodiment, for example, the display controller 64 controls the display state of the aerial vehicle photographing image on the display 26 included in the HMD 10 depending on whether the determination that the operator is not viewing the unmanned aerial vehicle 12 with his or her eyes is continued. The display controller 64 may control the display state of the aerial vehicle photographing image on the display 26 included in the HMD 10 depending on the result of determination by the determiner 62. The display controller 64 may display information on the unmanned aerial vehicle 12 such as the speed of the unmanned aerial vehicle 12, the position (e.g., latitude, longitude, or altitude) of the unmanned aerial vehicle 12, a distance from the operator to the unmanned aerial vehicle 12, a distance to a destination, or a remaining battery capacity.

In this embodiment, for example, the guide module 66 provides the operator with guide information for guiding the operator so as to enable the operator to view the unmanned aerial vehicle 12 with his or her eyes when the operator is not viewing the unmanned aerial vehicle 12 with his or her eyes. For example, the guide module 66 may generate an operator photographing image on which a guide image, for example, an arrow image indicating the direction of existence of the unmanned aerial vehicle 12, is superimposed.

The operator in this embodiment is only required to be a person who can operate the unmanned aerial vehicle 12, and the operator is not required to actually operate the unmanned aerial vehicle 12. For example, when the unmanned aerial vehicle 12 has an autonomous flight function, and it is possible to switch between the state of autonomous flight and the state of manual flight, a person holding the operation terminal 14 during autonomous flight of the unmanned aerial vehicle 12 corresponds to the operator in this embodiment.

Figure 5:
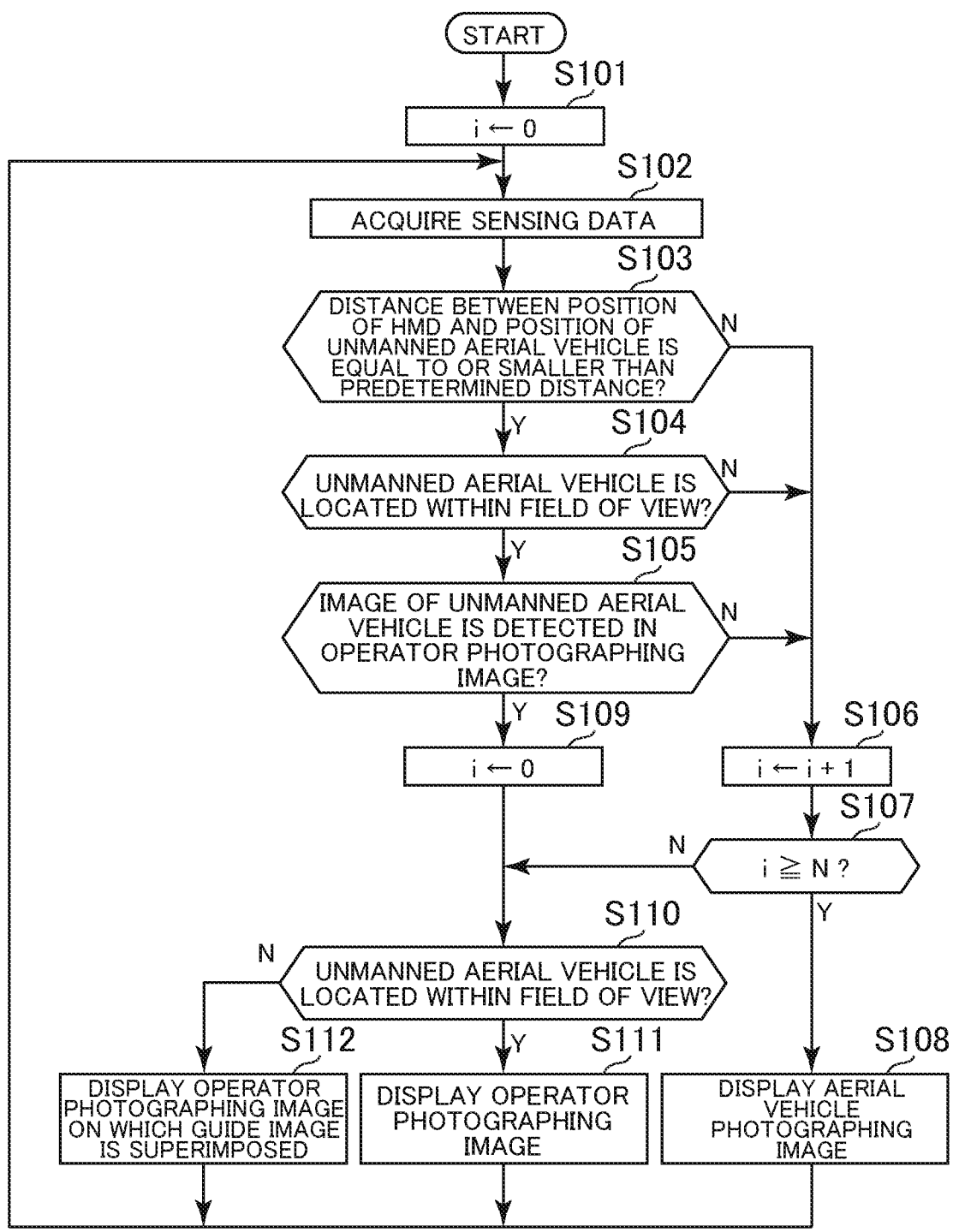
FIG. 5 is a flow chart for illustrating an example of a flow of processing to be executed by the head-mounted display in one embodiment of the present invention.

Now, a description is given of an exemplary flow of processing to be executed by the HMD 10 in this embodiment with reference to a flow chart illustrated in FIG. 5.

Further, in this embodiment, for example, it is assumed that an image is displayed on the display 26 at a predetermined frame rate corresponding to the above-mentioned predetermined sampling rate. Further, it is assumed that the processing illustrated in Step S102 to Step S112 is repeatedly executed at the predetermined frame rate. In this example of processing, when the determination that the operator is not viewing the unmanned aerial vehicle 12 with his or her eyes is made continuously over N frames (continuously for N times), it is determined that the determination that the operator is not viewing the unmanned aerial vehicle 12 with his or her eyes is continued. In this case, N is an integer of 2 or more.

First, the determiner 62 sets the value of a variable i to 0 (Step S101).

Then, the sensing data acquisition module 60 acquires sensing data in the frame (Step S102). The sensing data includes an aerial vehicle photographing image in the frame, and an operator photographing image in the frame.

Then, the determiner 62 determines whether the distance between the position of the HMD 10 and the position of the unmanned aerial vehicle 12 is equal to or smaller than a predetermined distance based on the sensing data acquired in the processing illustrated in Step S102 (Step S103). In this case, as the position of the HMD 10, for example, a position measured by the sensor group 28 or a position of the camera device 30 identified based on the results of measurement by the sensor group 28 may be used. Further, as the position of the unmanned aerial vehicle 12, a position measured by the sensor group 46 or a position of the camera device 48 identified based on the results of measurement by the sensor group 46 may be used.

Further, the above-mentioned predetermined distance may be determined in advance based on a design value of the resolution, the angle of view, or the like of the display 26 or on a design value of the resolution, the angle of view, or the like of the camera device 30. Further, the above-mentioned predetermined distance may be a distance in a three-dimensional space, or may be a distance on a horizontal plane between a position of the HMD 10 projected onto the horizontal plane and a position of the unmanned aerial vehicle 12 projected onto the horizontal plane.

Further, the above-mentioned distance may be different for a horizontal direction and a height direction. For example, the distance between the position of the HMD 10 projected onto the horizontal plane and the position of the unmanned aerial vehicle 12 projected onto the horizontal plane may be identified as a first distance. Further, a distance between a position of the HMD 10 projected onto a vertical line and a position of the unmanned aerial vehicle 12 projected onto the vertical line may be identified as a second distance. Then, when the first distance is equal to or smaller than a first predetermined distance, and a value indicating the second distance is equal to or smaller than a second predetermined distance, the distance between the position of the HMD 10 and the position of the unmanned aerial vehicle 12 may be determined to be equal to or smaller than the predetermined distance. Otherwise, the distance between the position of the HMD 10 and the position of the unmanned aerial vehicle 12 may be determined not to be equal to or smaller than the predetermined distance.

Now, it is assumed that the distance between the position of the HMD 10 and the position of the unmanned aerial vehicle 12 is equal to or smaller than the predetermined distance in the processing illustrated in Step S103 (Step S103: Y). In this case, the determiner 62 determines whether the unmanned aerial vehicle 12 is located within the range of the field of view of the camera device 30 (Step S104).

The phrase "range of the field of view of the camera device 30" herein refers to, for example, a range occupied by a frustum in the three-dimensional space, which is identified based on the posture of the head of the operator, the position of the operator, and the design value of the angle of view or the like of the camera device 30. The posture of the head of the operator and the position of the operator are identified based on the results of measurement by the sensor group 28, for example.

The range of the field of view of the camera device 30 in the processing illustrated in Step S104 refers to a range of the field of view in which the influence of an obstacle is not taken into consideration. Thus, for example, when the unmanned aerial vehicle 12 exists at the position P3 indicated in FIG. 3, and the operator faces toward the position P3 at the position P0 (faces in the direction A3), it is determined that the unmanned aerial vehicle 12 is located within the range of the field of view of the camera device 30.

Now, it is assumed that the unmanned aerial vehicle 12 is determined to be located within the range of the field of view of the camera device 30 in the processing illustrated in Step S104 (Step S104: Y). In this case, the determiner 62 determines whether an image of the unmanned aerial vehicle 12 is detected in the operator photographing image included in the sensing data acquired in the processing illustrated in Step S102 (Step S105). This detection may be performed by using a publicly known image recognition technology.

The position of the unmanned aerial vehicle 12 in the operator photographing image, which is projected onto the operator photographing image, may be identified based on the range of the field of view determined in the processing illustrated in Step S104 and the position of the unmanned aerial vehicle 12 indicated by the sensing data acquired in the processing illustrated in Step S102. The image of the unmanned aerial vehicle 12 is likely to be at the position identified in this manner in the operator photographing image. This detection may be performed only near the position identified in this manner. With this, it is possible to reduce the load of detection processing. Further, it is possible to reduce the possibility of erroneous detection of the unmanned aerial vehicle 12 other than the unmanned aerial vehicle 12 operated by the operator.

It is assumed that, in the processing illustrated in Step S105, the image of the unmanned aerial vehicle 12 is determined not to be detected in the operator photographing image included in the sensing data acquired in the processing illustrated in Step S102 (Step S105: N). In this case, the determiner 62 increases the value of the variable i by one (Step S106). The determiner 62 increases the value of the variable i by one (Step S106) also when it is determined that the distance between the position of the HMD 10 and the position of the unmanned aerial vehicle 12 is not equal to or smaller than the predetermined distance in the processing illustrated in Step S103 (Step S103: N). Further, the determiner 62 increases the value of the variable i by one (Step S106) also when it is determined that the unmanned aerial vehicle 12 is not located within the field of view of the camera device 30 in the processing illustrated in Step S104 (Step S104: N).

When the processing illustrated in Step S106 is finished, the determiner 62 determines whether the value of the variable i is equal to or larger than a predetermined value N (Step S107). When it is determined that the value of the variable i is equal to or larger than the predetermined value N (Step S107: Y), the display controller 64 displays the aerial vehicle photographing image acquired in the processing illustrated in Step S102 on the display 26 (Step S108), and returns to the processing illustrated in Step S102.

On the contrary, it is assumed that, in the processing illustrated in Step S105, the image of the unmanned aerial vehicle 12 is determined to be detected in the operator photographing image included in the sensing data acquired in the processing illustrated in Step S102 (Step S105: Y). In this case, the determiner 62 updates the value of the variable i to 0 (Step S109).

Then, the determiner 62 determines whether the unmanned aerial vehicle 12 is located within the field of view of the camera device 30 (Step S110). The determiner 62 determines whether the unmanned aerial vehicle 12 is located within the field of view of the camera device 30 (Step S110) also when it is determined that the value of the variable i is not equal to or larger than the predetermined value N in the processing illustrated in Step S107 (Step S107: N). The processing illustrated in Step S110 is similar to the processing illustrated in Step S104. When the processing illustrated in Step S104 is executed in the frame, the determiner 62 may use the result of execution of the processing as a result of execution of the processing illustrated in Step S110.

It is assumed that the unmanned aerial vehicle 12 is determined to be located within the field of view of the camera device 30 in the processing illustrated in Step S110 (Step S110: Y). In this case, the display controller 64 displays, on the display 26, the operator photographing image acquired in the processing illustrated in Step S102 (Step S111), and returns to the processing illustrated in Step S102.

On the contrary, it is assumed that the unmanned aerial vehicle 12 is determined not to be located within the field of view of the camera device 30 in the processing illustrated in Step S110 (Step S110: N). In this case, the display controller 64 displays, on the display 26, an operator photographing image on which a guide image for guiding the operator so as to enable the operator to view the unmanned aerial vehicle 12 with his or her eyes is superimposed (Step S112), and returns to the processing illustrated in Step S102.

In the processing illustrated in Step S112, for example, the guide module 66 may identify the direction of existence of the unmanned aerial vehicle 12 based on the range of the field of view of the camera device 30 and the position of the unmanned aerial vehicle 12. For example, this direction corresponds to a direction in which the camera device 30 is to be moved so that the unmanned aerial vehicle 12 is located within the range of the field of view of the camera device 30. Then, the guide module 66 may generate an operator photographing image on which a guide image, which is an arrow image indicating the identified direction, is superimposed. For example, when the unmanned aerial vehicle 12 exists in an upper left direction with respect to the direction of the camera device 30, an operator photographing image on which a guide image, which is an arrow image indicating the upper left direction, is superimposed may be generated. Then, the display controller 64 may display, on the display 26, an operator photographing image on which the guide image generated in this manner is superimposed.

In the above-mentioned example of processing, it is determined whether the operator is viewing the unmanned aerial vehicle 12 with his or her eyes in the processing illustrated in Step S103 to Step S105. In this case, for example, it is determined that the operator is not viewing the unmanned aerial vehicle 12 with his or her eyes under a situation in which the operator photographing image including the image of the unmanned aerial vehicle 12 can be photographed when the HMD 10 is directed in an appropriate direction, but the operator photographing image including the image of the unmanned aerial vehicle 12 is not photographed currently.

Further, in the above-mentioned example of processing, the determiner 62 determines whether the determination that the operator is not viewing the unmanned aerial vehicle 12 with his or her eyes is made continuously for a predetermined number of times (N times in this case, for example). Then, the display controller 64 controls the display state of the aerial vehicle photographing image on the display 26 depending on the result of determining whether the determination that the operator is not viewing the unmanned aerial vehicle 12 with his or her eyes is made continuously for the predetermined number of times. In this case, the determiner 62 determines whether the determination that the operator is not viewing the unmanned aerial vehicle 12 with his or her eyes is continued depending on whether the determination that the operator is not viewing the unmanned aerial vehicle 12 with his or her eyes is made continuously for the predetermined number of times.

The determination of whether the determination that the operator is not viewing the unmanned aerial vehicle 12 with his or her eyes is continued may be made based not on the above-mentioned number of times but on a period of time. For example, the determiner 62 may determine whether the determination that the operator is not viewing the unmanned aerial vehicle 12 with his or her eyes is continued over a predetermined period of time (e.g., t seconds). Then, the display controller 64 may control the display state of the aerial vehicle photographing image on the display 26 depending on the result of determining whether the determination that the operator is not viewing the unmanned aerial vehicle 12 with his or her eyes is continued over the predetermined period of time. For example, the aerial vehicle photographing image may be displayed when it is determined that the determination that the operator is not viewing the unmanned aerial vehicle 12 with his or her eyes is continued over the predetermined period of time. In this case, the determiner 62 determines whether the determination that the operator is not viewing the unmanned aerial vehicle 12 with his or her eyes is continued depending on whether the determination that the operator is not viewing the unmanned aerial vehicle 12 with his or her eyes is continued over the predetermined period of time.

In the above-mentioned example of processing, in general, the processing illustrated in Step S104 has a higher processing load than the processing illustrated in Step S103. Further, the processing illustrated in Step S105 has a higher processing load than that of the processing illustrated in Step S104. Thus, when it is determined that the distance between the position of the HMD 10 and the position of the unmanned aerial vehicle 12 is not equal to or smaller than the predetermined distance in the processing illustrated in Step S103, the processing illustrated in Step S104 and Step S105 having a high processing load is not executed. Further, the processing illustrated in Step S105 having a high processing load is not executed in the frame also when the unmanned aerial vehicle 12 is determined not to be located within the range of the field of view of the camera device 30 in the processing illustrated in Step S104.

The order of processing illustrated in Step S103 to Step S105 is not limited to that illustrated in FIG. 5. The processing illustrated in Step S103 to Step S105 may be executed in an order different from that illustrated in FIG. 5. Further, all the processing procedures illustrated in Step S103 to Step S105 are not required to be executed.

Further, the processing illustrated in Step S103 to Step S105 is only an example of processing of determining whether the operator is viewing the unmanned aerial vehicle 12 with his or her eyes, and the processing of determining whether the operator is viewing the unmanned aerial vehicle 12 with his or her eyes is not limited to the processing illustrated in Step S103 to Step S105.

Further, the processing illustrated in Step S110 to Step S112 may not be executed. In this case, for example, when it is determined that the value of the variable i is not equal to or larger than the predetermined value N in the processing illustrated in Step S107, or when the processing illustrated in Step S109 is finished, the display controller 64 may display the operator photographing image on the display 26, and return to the processing illustrated in Step S102.

Further, the display controller 64 may control the size of the aerial vehicle photographing image displayed on the display 26 depending on whether the determination that the operator is not viewing the unmanned aerial vehicle 12 with his or her eyes is made continuously for a predetermined period of time. For example, the display controller 64 may control the operator photographing image to be displayed in a larger size than that of the aerial vehicle photographing image in the processing illustrated in Step S111 and Step S112. Then, in this case, the display controller 64 may control the aerial vehicle photographing image to be displayed in a larger size than that of the operator photographing image in the processing illustrated in Step S108.

Alternatively, for example, in the processing illustrated in Step S111 and Step S112, the display controller 64 may control the aerial vehicle photographing image to be displayed on the entire screen of the display 26, and control the operator photographing image to be displayed as a wipe on a part of the display 26. Then, in this case, in the processing illustrated in Step S108, the display controller 64 may control the aerial vehicle photographing image to be displayed on the entire screen of the display 26, and control the operator photographing image to be displayed as a wipe on a part of the display 26.

Further, when the image displayed on the display 26 is switched from the aerial vehicle photographing image to the operator photographing image, or when the image displayed on the display 26 is switched from the operator photographing image to the aerial vehicle photographing image, the HMD 10 may notify the operator of that fact through display output or sound output, for example. Further, in this case, for example, the operator may be able to select whether to switch the image. For example, the HMD 10 may switch the image displayed on the display 26 depending on an operation performed by the operator, for example.

Further, for example, the operator photographing image may be displayed on the display 26 when it is determined that the operator is viewing the unmanned aerial vehicle 12 with his or her eyes continuously for a predetermined number of times or continuously for a predetermined period of time. For example, the predetermined number of times at the time of displaying the operator photographing image and the predetermined number of times at the time of displaying the aerial vehicle photographing image may be different from each other. Further, for example, the predetermined period of time at the time of displaying the operator photographing image and the predetermined period of time at the time of displaying the aerial vehicle photographing image may be different from each other. In this manner, it is possible to further prevent frequent switching of the displayed image.

Further, in the processing illustrated in Step S103, the predetermined distance at the time of displaying the operator photographing image and the predetermined distance at the time of displaying the aerial vehicle photographing image may be different from each other. For example, the predetermined distance at the time of displaying the aerial vehicle photographing image may be longer than the predetermined distance at the time of displaying the operator photographing image. Alternatively, the predetermined distance at the time of displaying the operator photographing image may be longer than the predetermined distance at the time of displaying the aerial vehicle photographing image. In this manner, it is possible to prevent frequent switching of the displayed image.

Further, the guide module 66 may generate a guide image on which a character string image representing a sentence for guiding the operator, such as "The drone is flying in the upper left direction" or "Please look in the upper left direction", is arranged in addition to the arrow image or in place of the arrow image. Then, the guide module 66 may generate an operator photographing image on which the guide image is superimposed. Further, the guide module 66 may output to the operator a sound for guiding the operator, such as "The drone is flying in the upper left direction" or "Please look in the upper left direction", in addition to superimposition of the guide image or in place of superimposition of the guide image.

Note that, the present invention is not limited to the above-mentioned embodiment.

For example, in the above description, the HMD 10 is set as the video see-through HMD 10. However, the present invention can also be applied even when the HMD 10 is an optical see-through HMD 10. In this case, for example, the display controller 64 may control the aerial vehicle photographing image to be displayed in the processing illustrated in Step S108, and control the aerial vehicle photographing image not to be displayed in the processing illustrated in Step S111 or Step S112. Alternatively, the aerial vehicle photographing image may be displayed in a larger size in the processing illustrated in Step S108, and the aerial vehicle photographing image may be displayed in a smaller size in the processing illustrated in Step S111 or Step S112. When display of the aerial vehicle photographing image is suppressed, the operator can more easily view the unmanned aerial vehicle 12 with his or her eyes.

In this case, in the processing illustrated in Step S104 and Step S110, the range of the field of view of the operator may be used in place of the range of the field of view of the camera device 30. In this case, the range of the field of view of the operator may be identified based on the posture of the head of the operator and a given angle of field of view of the operator, for example. Further, the predetermined distance in the processing illustrated in Step S103 may be set depending on eyesight of the operator. Further, in this case, the operator photographing image photographed by the camera device 30 may be used only for the processing illustrated in Step S105.

Further, in this case, the display controller 64 may display augmented reality (AR) of the guide image on the display 26 in the processing illustrated in Step S112.

Further, in the processing illustrated in Step S111 or Step S112, the display controller 64 may display on the display 26 AR of information for assisting in operation. In this case, the information is desired to be arranged at a place that is not the center or with a high degree of transparency so as not to block the eyesight of the unmanned aerial vehicle 12.

The range of application of the present invention is not limited to the HMD 10. For example, the present invention can also be applied to a case in which the operator operates the unmanned aerial vehicle 12 while seeing a display, which is not the HMD 10. In this case, an image photographed by a camera installed at a takeoff location or landing location of the unmanned aerial vehicle 12 in place of the camera device 30 of the HMD 10 may be used as the operator photographing image. Further, the camera is not required to be a fixed camera, and for example, may be a camera whose posture can be controlled by the operator (e.g., pan-tilt camera), for example.

Further, in this embodiment, apart or all of the functions illustrated in FIG. 4 may be implemented in the unmanned aerial vehicle 12 or the operation terminal 14.

Further, the specific character strings and numerical values described above and the specific numerical values and character strings in the drawings are merely exemplary, and the present invention is not limited to those character strings and numerical values.

The invention claimed is:

1. A display control system, comprising:
   at least one processor; and
   at least one memory device that stores a plurality of instructions which, when executed by the at least one processor, causes the at least one processor to:
   acquire an aerial vehicle photographing image photographed by a camera included in an unmanned aerial vehicle in flight;
   determine whether an operator of the unmanned aerial vehicle is viewing the unmanned aerial vehicle with his or her eyes based on sensing data on at least one of the unmanned aerial vehicle or the operator; and
   control a display state of the aerial vehicle photographing image on a display depending on whether determination that the operator is not viewing the unmanned aerial vehicle with his or her eyes is continued.

2. The display control system according to claim 1, wherein the at least one memory device that stores the plurality of instructions which further causes the at least one processor to:

determine whether the operator is not viewing the unmanned aerial vehicle with his or her eyes is continued depending on whether the operator is not viewing the unmanned aerial vehicle with his or her eyes is made continuously for a predetermined number of times, and control the display state of the aerial vehicle photographing image on the display depending on a result of determining whether the determination that the operator is not viewing the unmanned aerial vehicle with his or her eyes is made continuously for the predetermined number of times.

3. The display control system according to claim 1, wherein the at least one memory device that stores the plurality of instructions which further causes the at least one processor to:

determine whether the operator is not viewing the unmanned aerial vehicle with his or her eyes is continued depending on whether the operator is not viewing the unmanned aerial vehicle with his or her eyes is continued over a predetermined period of time, and control the display state of the aerial vehicle photographing image on the display depending on a result of determining whether the determination that the operator is not viewing the unmanned aerial vehicle with his or her eyes is continued over the predetermined period of time.

4. The display control system according to claim 1, wherein the at least one memory device that stores the plurality of instructions which further causes the at least one processor to control whether to display the aerial vehicle photographing image on the display depending on whether the determination that the operator is not viewing the unmanned aerial vehicle with his or her eyes is continued.

5. The display control system according to claim 1, wherein the at least one memory device that stores the plurality of instructions which further causes the at least one processor to control a size of the aerial vehicle photographing image displayed on the display depending on whether the determination that the operator is not viewing the unmanned aerial vehicle with his or her eyes is continued.

6. The display control system according to claim 1, wherein the at least one memory device that stores the plurality of instructions which further causes the at least one processor to determine whether the operator is viewing the unmanned aerial vehicle with his or her eyes based on a determination whether a distance between a position of the operator and the position of the unmanned aerial vehicle is equal to or smaller than a predetermined distance.

7. The display control system according to claim 1, wherein the at least one memory device that stores the plurality of instructions which further causes the at least one processor to determine whether the operator is viewing the unmanned aerial vehicle with his or her eyes based on a range of a field of view of the operator and on a position of the unmanned aerial vehicle.

8. The display control system according to claim 1, wherein the at least one memory device that stores the plurality of instructions which further causes the at least one processor to determine whether the operator is viewing the unmanned aerial vehicle with his or her eyes based on an operator photographing image photographed by a camera arranged at a head of the operator.

9. The display control system according to claim 1, wherein the at least one memory device that stores the plurality of instructions which further causes the at least one processor to control the display state of the aerial vehicle photographing image on the display included in a head-mounted display worn by the operator, depending on whether the determination that the operator is not viewing the unmanned aerial vehicle with his or her eyes is continued.

10. The display control system according to claim 1, wherein the at least one memory device that stores the plurality of instructions which further causes the at least one processor to:

determine whether the operator is viewing the unmanned aerial vehicle with his or her eyes based on an operator photographing image photographed by a camera included in a head-mounted display worn by the operator, and control the display state of the aerial vehicle photographing image on the display included in the head-mounted display, depending on whether the determination that the operator is not viewing the unmanned aerial vehicle with his or her eyes is continued.

11. The display control system according to claim 1, wherein the at least one memory device that stores the plurality of instructions which further causes the at least one processor to provide the operator with guide information for guiding the operator so as to enable the operator to view the unmanned aerial vehicle with his or her eyes when the operator is not viewing the unmanned aerial vehicle with his or her eyes.

12. The display control system according to claim 1, wherein the at least one memory device that stores the plurality of instructions which further causes the at least one processor to:

determine whether the operator is viewing the unmanned aerial vehicle with his or her eyes based on a distance between the unmanned aerial vehicle and the operator, a range of a field of view of the operator and on a position of the unmanned aerial vehicle, and an operator photographing image photographed by a camera arranged at a head of the operator.

13. The display control system according to claim 1, wherein the at least one memory device that stores the plurality of instructions which further causes the at least one processor to:

control the display state of the aerial vehicle photographing image on the display to display an operator photographing image photographed by a camera arranged at a head of the operator if the operator is viewing the unmanned aerial vehicle with his or her eyes; and control the display state of the aerial vehicle photographing image on the display to display either the operator photographing image with a guide image superimposed to direct the operator to the unmanned aerial vehicle or to display the aerial vehicle photographing image if the operator is not viewing the unmanned aerial vehicle with his or her eyes.

14. A display control device, comprising:

at least one processor; and at least one memory device that stores a plurality of instructions which, when executed by the at least one processor, causes the at least one processor to:

acquire an aerial vehicle photographing image photographed by a camera included in an unmanned aerial vehicle in flight;

determine whether an operator of the unmanned aerial vehicle is viewing the unmanned aerial vehicle with his or her eyes based on sensing data on at least one of the unmanned aerial vehicle or the operator; and control a display state of the aerial vehicle photographing image on a display depending on whether determination that the operator is not viewing the unmanned aerial vehicle with his or her eyes is continued.

15. A display control method, comprising the steps of:

acquiring an aerial vehicle photographing image photographed by a camera included in an unmanned aerial vehicle in flight;

determining whether an operator of the unmanned aerial vehicle is viewing the unmanned aerial vehicle with his or her eyes based on sensing data on at least one of the unmanned aerial vehicle or the operator; and controlling a display state of the aerial vehicle photographing image on a display depending on whether determination that the operator is not viewing the unmanned aerial vehicle with his or her eyes is continued.

* * * * *